(12) United States Patent
Lissotschenko

(10) Patent No.: US 7,414,789 B2
(45) Date of Patent: Aug. 19, 2008

(54) APPARATUS FOR HOMOGENIZING LIGHT AND METHOD FOR PRODUCING THE APPARATUS

(75) Inventor: Vitalij Lissotschenko, Fröndenberg (DE)

(73) Assignee: Limo-Patentverwaltung GmbH & Co. KG, Gerstengrund (DE)

( * ) Notice: Subject to any disclaimer, the term of this patent is extended or adjusted under 35 U.S.C. 154(b) by 0 days.

(21) Appl. No.: 11/708,399

(22) Filed: Feb. 20, 2007

(65) Prior Publication Data

US 2007/0149043 A1 Jun. 28, 2007

Related U.S. Application Data

(63) Continuation of application No. PCT/EP2005/008556, filed on Aug. 6, 2005.

(30) Foreign Application Priority Data

Aug. 17, 2004 (DE) .................. 10 2004 039 936

(51) Int. Cl.
G02B 27/10 (2006.01)

(52) U.S. Cl. ...................... 359/618; 359/619

(58) Field of Classification Search ............... 359/618, 359/619, 729, 850; 362/244
See application file for complete search history.

(56) References Cited

U.S. PATENT DOCUMENTS

| | | | |
|---|---|---|---|
| 4,497,015 A | 1/1985 | Konno et al. | |
| 4,733,944 A | 3/1988 | Fahlen et al. | |
| 4,769,750 A | 9/1988 | Matsumoto et al. | |
| 6,014,260 A | 1/2000 | Godard et al. | |
| 6,038,075 A | 3/2000 | Yamazaki et al. | |
| 6,212,011 B1 | 4/2001 | Lissotschenko et al. | |
| 6,373,633 B1 | 4/2002 | Brown | |
| 6,548,781 B1 | 4/2003 | Brunwinkel | |
| 6,606,173 B2 * | 8/2003 | Kappel et al. | 359/15 |
| 6,621,639 B2 | 9/2003 | Kahlert et al. | |
| 6,859,326 B2 * | 2/2005 | Sales | 359/619 |
| 7,186,004 B2 * | 3/2007 | Powell et al. | 362/244 |
| 2004/0223225 A1 | 11/2004 | Mikhailov | |

FOREIGN PATENT DOCUMENTS

| | | |
|---|---|---|
| CN | 1344953 A | 4/2002 |
| DE | 196 35 942 A1 | 3/1998 |
| DE | 199 15 000 A1 | 10/2000 |
| DE | 101 32 840 A1 | 3/2002 |
| DE | 100 49 557 A1 | 4/2002 |
| DE | 101 39 355 A1 | 2/2003 |

(Continued)

Primary Examiner—Hung X. Dang
Assistant Examiner—Vipin M Patel
(74) Attorney, Agent, or Firm—Laurence A. Greenberg; Werner H. Stemer; Ralph E. Locher

(57) ABSTRACT

A method produces an apparatus for homogenizing light. The apparatus has at least one substrate with at least one optically functional area with a multiplicity of lens elements. In a first method step the lens elements are formed in the at least one optically functional area of the at least one substrate. In a second method step the at least one substrate is divided into at least two parts. In a third method step following thereupon, at least two of the at least two parts of the at least one substrate are reassembled, given another alignment of at least one of the parts.

17 Claims, 3 Drawing Sheets

FOREIGN PATENT DOCUMENTS

| | | |
|---|---|---|
| DE | 102 25 674 A1 | 12/2003 |
| EP | 1 396 735 A1 | 3/2004 |
| JP | 1-167803 | 7/1989 |
| JP | 1-245235 | 9/1989 |
| JP | 6-123921 | 5/1994 |
| JP | 6-342187 | 12/1994 |
| JP | 1396735 A1 * | 3/2004 |
| WO | WO 02/13336 A | 2/2002 |
| WO | 03016963 A2 | 2/2003 |

* cited by examiner

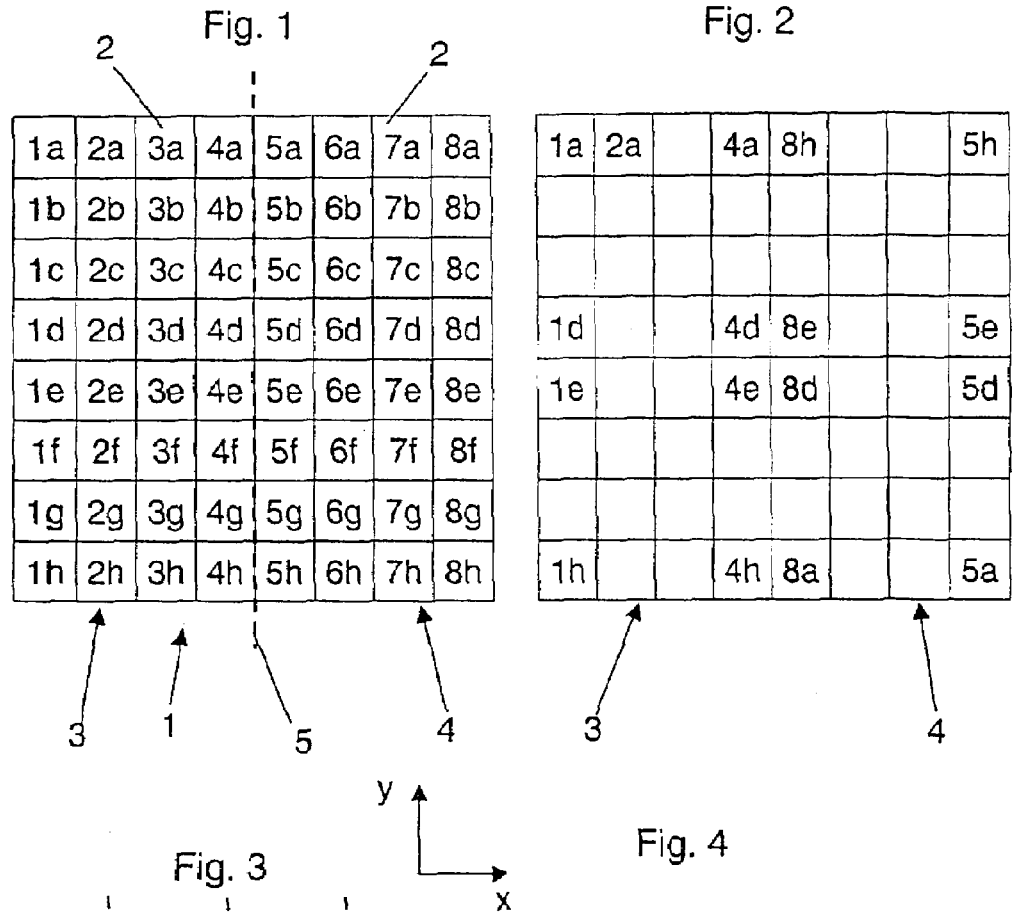
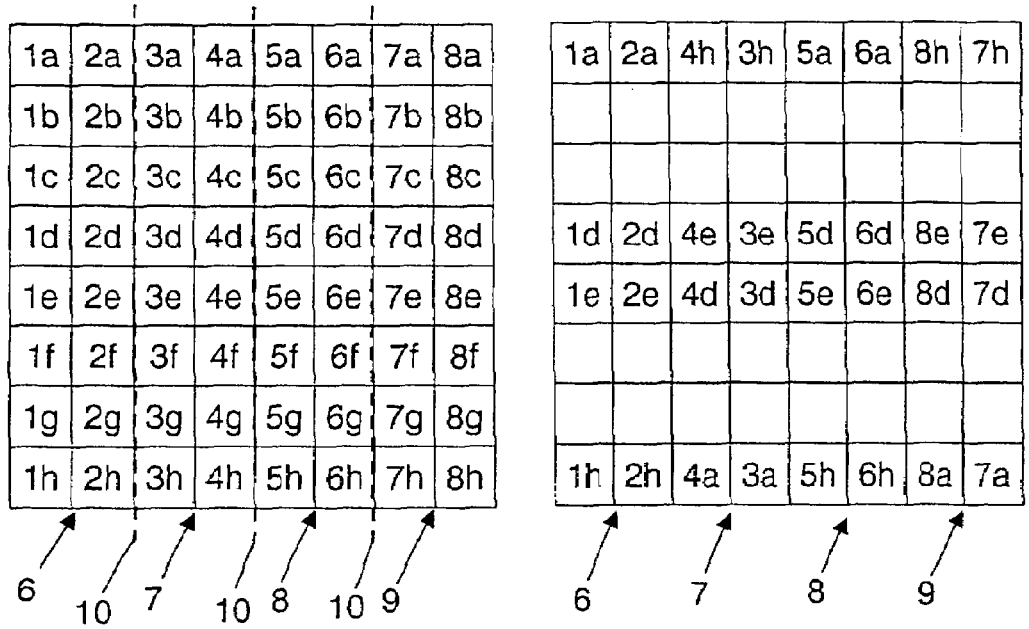

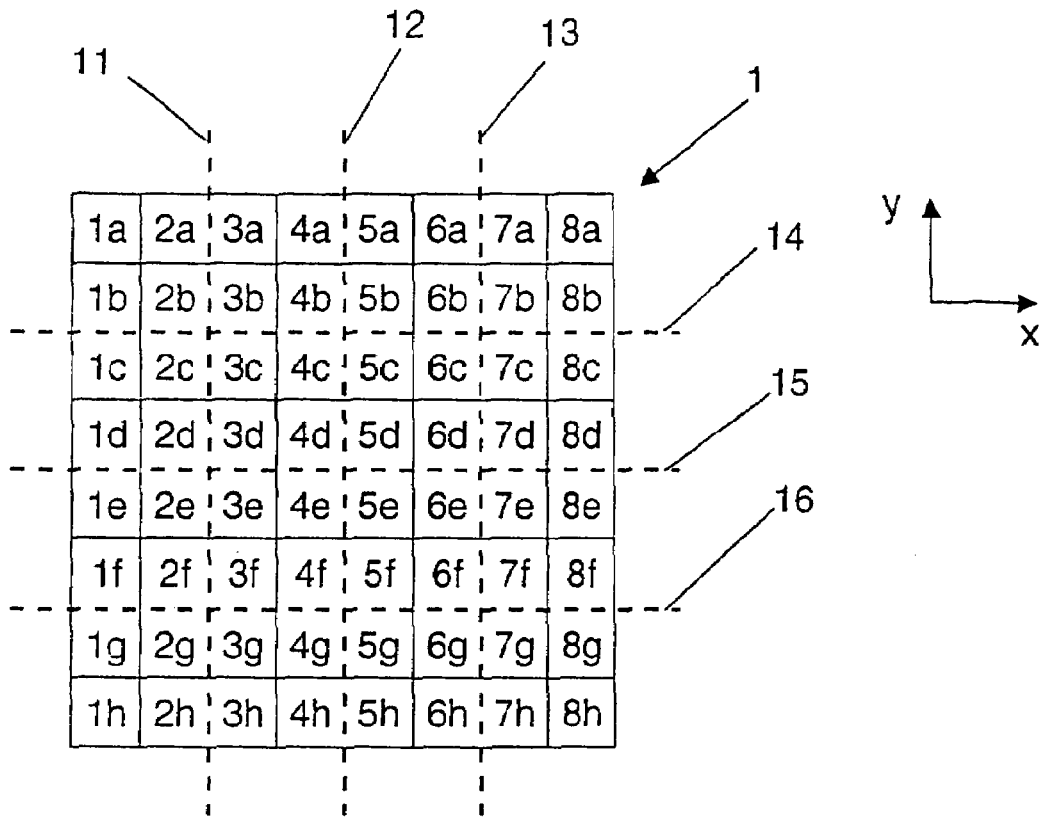

APPARATUS FOR HOMOGENIZING LIGHT AND METHOD FOR PRODUCING THE APPARATUS

CROSS-REFERENCE TO RELATED APPLICATIONS

This is a continuing application, under 35 U.S.C. §120, of copending international application PCT/EP2005/008556, filed Aug. 6, 2005, which designated the United States; this application also claims the priority, under 35 U.S.C. §119, of German patent application DE 10 2004 039 936.0, filed Aug. 17, 2004; the prior applications are herewith incorporated by reference in their entirety.

BACKGROUND OF THE INVENTION

Field of the Invention

The present invention relates to a method for forming an apparatus having at least one substrate with at least one optically functional area and a multiplicity of lens elements disposed in the at least one optically functional area of the at least one substrate.

A method and an apparatus of the abovenamed type are disclosed in published, non-prosecuted German patent application DE 101 39 355 A1, corresponding to U.S. patent disclosure No. 2004/0223225 A1. It proves to be disadvantageous with such apparatuses that the surfaces of the lens elements have a surface roughness that is too large for specific applications, for example for lithographic applications in the field of chip production. In particular, such lens elements for the most part have systematic surface irregularities that recur on every one of the lens elements. These elements with surface roughness or surface irregularities can in this case lead to the fact that the actual surface shape deviates from the desired calculated surface by a few tens of a nanometer or more. Owing to the fact that with such homogenization apparatuses the light that penetrates through the individual lens elements is generally superposed in a working plane, the disturbances, caused by the surface irregularities, in the intensity distributions in the working plane are also added together. For the most part, in the case of homogenization apparatuses of the abovenamed type the component beams penetrating through individual ones of the lens elements are superposed in the working plane in such a way that identical sites of the individual lens elements contribute to the same site in the working plane. As a result, the superposition of the light, penetrating through the individual lens elements, in the working plane does not average out a systematic irregularity recurring with all the lens elements. Rather, the result is an intensity distribution of the homogenized light in the working plane such as is depicted by way of example in a schematic and exaggerated fashion in FIG. 7.

SUMMARY OF THE INVENTION

It is accordingly an object of the invention to provide an apparatus for homogenizing light and a method for producing the apparatus which overcome the above-mentioned disadvantages of the prior art methods and devices of this general type, by which light can be more effectively homogenized.

With the foregoing and other objects in view there is provided, in accordance with the invention, a method for producing an apparatus for homogenizing light. The method includes providing at least one substrate having at least one optically functional area, forming a plurality of lens elements in the at least one optically functional area, dividing the at least one substrate into at least two parts, and reassembling at least two of the at least two parts of the at least one substrate with at least one of the parts having a different alignment.

It is provided in accordance with the invention that the at least one substrate is divided into at least two parts, and that at least two of the at least two parts of the at least one substrate are reassembled, given another alignment of at least one of the parts. By the other alignment of at least one of the at least two parts, it can be prevented that deviations, caused by the systematic irregularities in the surface, in the light are added together after penetrating through the individual lens elements of the parts.

For example, it is possible for at least one of the parts to be rotated after division before it is assembled with the at least one other part. It is possible thereby, for example, for the rotation to be a rotation by 180°. In some circumstances, therefore, as a result of such a rotation the effect of the systematic irregularities in the rotated part is exactly reversed such that it is cancelled by the effect that is caused upon the penetration of the light through the at least one other of the at least two parts. There is thus a possibility of attaining a very homogeneous intensity distribution in a working plane.

It is possible in this case for the rotation to be performed about an axis that is parallel to the mean propagation direction of the light to be homogenized.

There is the possibility that the at least one substrate is divided up into more than two parts, in particular into four parts or into eight parts or into sixteen parts, or else into a number of parts that does not correspond to a power of two. The more inhomogeneous the light impinging on the homogenization apparatus, the more likely that the substrate must be decomposed into a larger number of parts, in which case individual ones of these parts must be introduced into the assembling substrate again with another alignment, or individual ones of these parts must be rotated. An effective homogenization can even be attained given a comparatively large input inhomogeneity, owing to the large number of parts aligned otherwise.

There is the possibility, for example, that the substrate is divided into strip-shaped parts that have fewer lens elements in a first direction than in a second direction perpendicular thereto.

In a further embodiment of the invention, it is provided that a number of substrates are divided up into at least two parts in each case, and subsequent thereto parts of different substrates are assembled to form a new substrate. There is thus the possibility of exerting targeted influence on the intensity distribution in the working plane, because the different substrates can have different properties. It is possible by such a measure to assemble as with a modular system an apparatus for homogenization that has the desired properties.

In particular, it is possible that before the assembly of the substrate of parts of different substrates the intensity distribution to be attained in a working plane is analyzed, and the selection and orientation of the parts used for the assembly are selected on the basis of this analysis. For example, in this case the apparatus for homogenizing can be inserted into a larger apparatus for illuminating a working plane. It is also possible, for example, in this apparatus for illuminating a working plane to arrange downstream of the at least one substrate Fourier lenses that contribute to the superposition of the light penetrating through the individual lens elements in the working plane. It is also possible, furthermore, to provide therein a focusing device that contribute to the shaping of the light beam or the light. For example, the apparatus for illuminating a working plane can also contain light sources such as, for example, an excimer laser or a semiconductor laser apparatus. It is possible in this case that a raw substrate with lens elements be introduced into such an apparatus, and that the intensity distribution attainable with this raw substrate in the working plane be recorded. This comparison of the intensity distribution attained with the aid of the raw substrate can be compared with a desired intensity distribution, parts of the individual substrates being assembled as in a puzzle on the basis of existing data relating to the individual substrates, in order to obtain the desired intensity distribution in the working plane.

In another embodiment of the invention, it is provided that the device be produced by the method according to the invention. The device contains lens elements formed as cylindrical lenses. In this case, it is possible by way of example to provide that the substrate has an optically functional area serving as an entrance face, and an optically functional area serving as an exit face. An array of cylindrical lenses is formed on each of these areas, and the cylinder axes of the array is arranged on the entrance face perpendicular to the cylinder axes of the array on the exit face. It is possible in this way for one of the lens elements to be formed by in each case two crossed cylindrical lenses situated opposite one another. Lens elements formed in such a way have a higher effectivity with regard to light throughput.

It is possible that the device has two substrates with at least two, in particular four optically functional areas, the two substrates are disposed in the propagation direction of the light to be homogenized in a fashion spaced apart from one another and one behind another. The homogenization of the light to be homogenized is further improved by such a refinement of the apparatus.

In accordance with yet a further embodiment of the invention, in the propagation direction of the light to be homogenized, the device has a lens device that is disposed downstream of the at least one substrate, serves as a Fourier lens and can mutually superpose the light penetrating through individual lens elements.

Other features which are considered as characteristic for the invention are set forth in the appended claims.

Although the invention is illustrated and described herein as embodied in an apparatus for homogenizing light and a method for producing the apparatus, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a diagrammatic, plan view of a substrate for an apparatus according to the invention;

FIG. 2 is a diagrammatic, plan view of the substrate after division, rotation and assembly;

FIG. 3 is a diagrammatic, plan view of the substrate in accordance with FIG. 1, with other cutting planes;

FIG. 4 is a diagrammatic, plan view of the substrate in accordance with FIG. 3 after division, rotation and assembly;

FIG. 5 is a diagrammatic, plan view of the substrate in accordance with FIG. 1, with other cutting planes;

FIG. 6 is a diagrammatic, plan view of the substrate in accordance with FIG. 5 after division, rotation and assembly;

Figure 7:
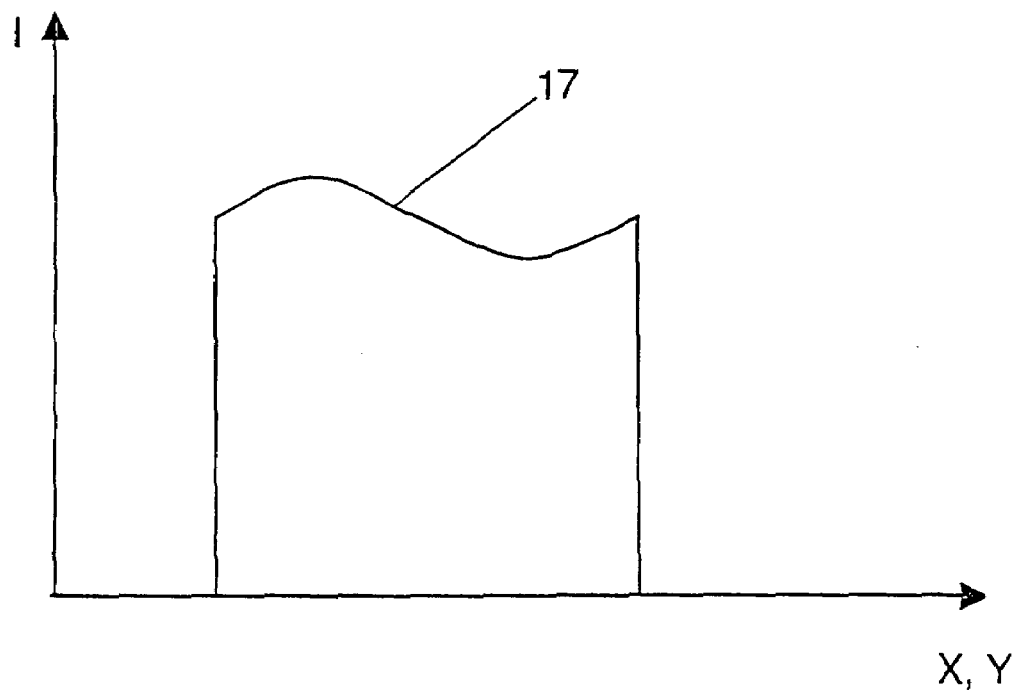
FIG. 7 is a graph showing an intensity distribution of light, penetrating through a substrate, in a working plane.

A Cartesian coordinate system is depicted in some figures for elucidation.

DESCRIPTION OF THE PREFERRED EMBODIMENTS

Referring now to the figures of the drawing in detail and first, particularly, to FIG. 1 thereof, there is shown by way of example a substrate 1 that has a number of lens elements 2. Sixty four lens elements 2 that are enumerated from $1a$ to $8h$ are depicted in the illustrated exemplary embodiment. It is by all means possible to provide more or fewer lens elements. The lens elements 2 can be, for example, spherical lens elements that are formed on one or both sides of the substrate 1. However, it is also entirely possible to form cylindrical lenses that are crossed relative to one another, for example, on a front side and a rear side of the substrate. In this case, the cylindrical lenses could extend in a Y-direction, that is to say in the direction from $1a$ to $1h$, for example, on the front side of the cylindrical lenses. Cylindrical lenses could extend in the X-direction, that is to say from $1a$ to $8a$, on the rear side of the substrate 1. The sixty four lens elements 2 illustrated could likewise be produced on the front side and rear side by the mutual crossing of the cylindrical lenses.

It is furthermore possible that an inventive apparatus contain more than one substrate with in each case one or two optically functional areas. Thus, for example, it is possible to dispose two substrates 1 one behind another, each of the substrate respectively containing mutually crossed cylindrical lens arrays on their entrance face and on their exit face.

The lens elements can be applied to the substrate 1 illustrated by way of example in FIG. 1 by conventional methods known from the prior art. For example, consideration is given here to shaping steps for introducing steps, and to melting steps subsequent thereto for smoothing the surfaces. The shaping can be accomplished, for example, by etching or by sputtering. Melting can be performed by an electron beam or laser beam, for example.

The substrate illustrated in FIG. 1 is divided into two parts 3, 4, for example by cutting, along a separation plane 5 extending in a Y-Z-plane. Thereafter, the part 4 of the substrate 1 is rotated by 180° about the Z-direction, that is to say about the later direction of penetration of the light to be homogenized. Subsequent thereto, the two parts 3, 4 are connected to one another again. This interconnection can be attained by bonding or other suitable connecting methods. FIG. 2 shows the substrate after the cutting and rotation of the part 4 and the renewed interconnection. It is clearly to be seen that the part 4 is rotated in such a way that the lens element $5a$ previously to be found at top left is now arranged at the bottom right.

FIG. 3 shows the same substrate 1, but in accordance with a variation of the inventive method the substrate is divided into four parts 6, 7, 8, 9 along three cutting planes 10 arranged in the Y-Z-plane. Subsequent thereto, the part 7 and the part 9 are respectively rotated by 180° about the Z-direction. FIG. 4 shows the substrate in accordance with FIG. 3 after division, rotation and assembly. Clearly, in the case of part 7 the element $3a$ previously arranged at the top left is arranged at the bottom right after assembly. Likewise, in the case of element 9 the element $7a$ previously arranged at the top left is now arranged at the bottom right.

FIG. 5 shows the substrate 1, which in an alternative method can be divided along six cutting planes 11, 12, 13, 14, 15, 16. In this case, the cutting planes 11, 12, 13 are Y-Z-planes, whereas the cutting planes 14, 15, 16, are X-Z-planes. Sixteen parts that respectively contain four lens elements result from dividing the substrate 1 along these cutting planes 11, 12, 13, 14, 15, 16.

FIG. 6 shows the substrate 1 after the division in accordance with FIG. 5 and the rotation of every second one of the parts by 180° about the Z-direction. In the illustration shown in FIG. 6, the parts rotated in each case were those having top left in their corner the lens elements 3a, 7a, 1c, 5c, 3e, 7e, 1g, 5g, but it is entirely possible to rotate other ones of the lens elements.

According to the invention, it is entirely possible to divide a substrate into various parts along other cutting or separation planes. Furthermore, it is possible to divide a substrate into unequally large parts. Furthermore, according to the invention it is possible to store a multiplicity of substrates in a divided fashion or as a whole such that substrates desired in accordance with customer specific requirements can be assembled with desired intensity distributions.

FIG. 7 depicts a desired intensity distribution (illustrated with exaggeration) in a working plane of the substrate 1 before division, rotation and assembly. It is to be seen, in particular, that the intensity distribution is not completely homogeneous, but has an elevation 17 in its left hand area. Such an elevation 17 can be produced by instances of systematic surface roughness of the individual lens elements. For example, these can be instances of very small systematic surface roughness in the individual lens elements in the range of a few tens of nanometers. The invention proceeds from the consideration that all the lens elements 2 make the same contribution to the light distribution in the working plane. In particular, homogenization apparatuses are generally configured such that the component beams, penetrating through individual lens elements, of the light to be homogenized are superposed in the working plane in such a way that the light penetrating through identical segments of the individual lens elements 2 contributes to the intensity distribution at the same point.

For this reason, the intensity distribution in the working plane that is illustrated in FIG. 7 also corresponds to the intensity distribution that an individual lens element contributes to the intensity distribution.

Thus, the rotation of one or more parts of the substrate rotates a plurality of the lens elements. In this case, the number of the rotated lens elements 2 generally corresponds exactly to the number of the nonrotated lens elements 2. The result of this is the intensity distribution, to be seen from FIG. 8, after the assembly of the mutually separate parts. The intensity distribution 17 of the nonrotated lens elements 2 is now compensated by an intensity distribution 17' of the rotated lens elements such that a resulting intensity distribution 18 that is decisively homogeneous is produced.

Figure 8:
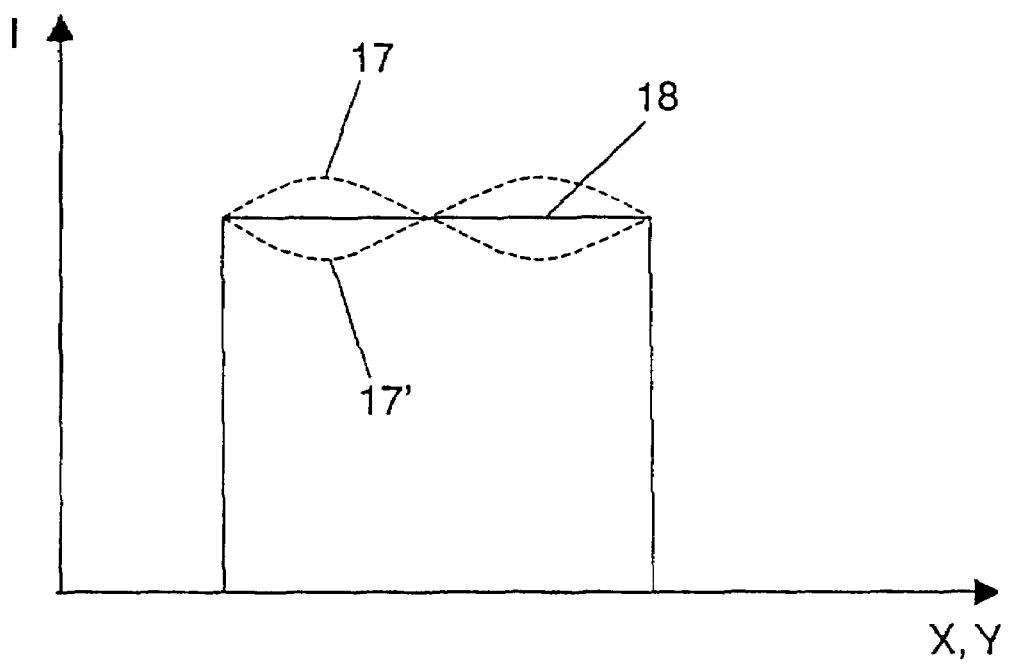
FIG. 8 is a graph showing a view of the intensity distribution in a working plane of the apparatus after division, rotation and assembly of the substrate.

It is entirely possible according to the invention to attain other shapes than the rectangular intensity distribution 18 illustrated in FIG. 8. Finally, it is possible here to produce by selecting the individual lens elements or by assembling lens elements from a multiplicity of substrates that have already been cut up and rotated as desired.

Moreover, it is possible to analyze a work environment by detecting the light distribution with the aid of a substrate after the lens elements 2 have been introduced into the work environment, and undertaking an analysis subsequent thereto. The analysis can be used to assemble a substrate from various suitable parts in such a way that a very homogeneous distribution can be produced in the working plane. The analysis and the selection of the parts that are to be assembled can be executed in this case by an appropriately powerful computer program.

The light to be homogenized can be, for example, the light of an excimer laser or the light of a semiconductor laser apparatus.

I claim:

1. A method for producing an apparatus for homogenizing light, which comprises the steps of:
    providing at least one substrate having at least one optically functional area;
    forming a plurality of lens elements in the at least one optically functional area, the lens elements each having a surface with systematic surface irregularities;
    dividing the at least one substrate into at least two parts each containing the lens elements; and
    reaasembling at least two of the at least two parts of the at least one substrate with at least one of the parts having a different alignment, due to the different alignment of the at least one of the at least two parts, deviations in light caused by systematic irregularities in the surface of the lens elements are added together after penetrating through individual ones of the lens elements of the at least two parts and substantially canceling each other out.

2. The method according to claim 1, which further comprises after the dividing step, rotating at least one of the at least two parts before it is assembled with another one of the at least two parts.

3. The method according to claim 2, which further comprises during the rotating step, the at least one part is rotated by 180°.

4. The method according to claim 2, which further comprises performing the rotating step by a rotation about an axis that is parallel to a mean propagation direction of the light to be homogenized.

5. The method according to claim 1, which further comprises dividing up the at least one substrate into more than two parts being selected from the group consisting of four parts, eight parts, sixteen parts, and a number of parts that does not correspond to a power of two.

6. The method according to claim 1, which further comprises dividing the substrate into strip-shaped parts that have fewer of the lens elements in a first direction than in a second direction perpendicular thereto.

7. The method according to claim 1, which further comprises:
    providing a plurality of substrates;
    dividing up each of the plurality of substrates into at least two parts; and
    subsequently assembling parts of different substrates to form a new substrate.

8. The method according to claim 7, which further comprises before an assembly of the new substrate from parts of different ones of the substrates, performing the steps of:
    analyzing an intensity distribution to be attained in a working plane; and
    performing a selection and orientation of the parts used for assembly of the new substrate on a basis of the analyzing step.

9. The method according to claim 1, which further comprises performing the dividing of the substrate along a delimiting line that separates neighboring lens elements from one another.

10. The method according to claim 1, which further comprises performing the dividing of the substrate along a plane that is parallel to a propagation direction of the light to be homogenized.

11. An apparatus for homogenizing light, the apparatus comprising:

at least one substrate having at least one optically functional area and a multiplicity of lens elements disposed in said optically functional area, said lens elements each having a surface with systematic surface irregularities, said at least one substrate being formed from at least two parts each containing said lens elements, at least one of said at least two parts of the substrate having another alignment than another one of the at least two parts, due to said another alignment of said at least one of said at least two parts, deviations in light caused by systematic irregularities in said surface of said lens elements are added together after penetrating through individual ones of said lens elements of said at least two parts and substantially canceling each other out.

12. The apparatus according to claim 11, wherein said lens elements are cylindrical lenses.

13. The apparatus according to claim 12, wherein said optically functional area includes a first optical functional area serving as an entrance face, and a second optically functional area serving as an exit face, an array of said cylindrical lenses being formed on each of said first and second optically functional areas, and cylinder axes of said array disposed on said entrance face are perpendicular to cylinder axes of said array on said exit face.

14. The apparatus according to claims 11, wherein said at least one substrate includes two substrates with at least two optically functional areas, said two substrates being disposed in a propagation direction of the light to be homogenized in a fashion spaced apart from one another and one behind another.

15. The apparatus according to claims 14, wherein said at least two optically functional areas include four optically functional areas.

16. The apparatus according to claim 11, further comprising a lens device disposed in a propagation direction of the light to be homogenized downstream of said at least one substrate, said lens device serving as a Fourier lens and can mutually superpose the light penetrating through individual ones of said lens elements.

17. The apparatus according to claim 11, wherein said at least two parts include a first part and a second part, said lens elements of said first part are rotated compared to said lens elements of said second part.

* * * * *